US012276143B2

(12) United States Patent
Castrogiovanni et al.

(10) Patent No.: US 12,276,143 B2
(45) Date of Patent: Apr. 15, 2025

(54) DEVICE AND METHOD FOR SECURING A DOOR

(71) Applicants: Steve J Castrogiovanni, Montrose, PA (US); Matthew David Hilbert, LaRaysville, PA (US)

(72) Inventors: Steve J Castrogiovanni, Montrose, PA (US); Matthew David Hilbert, LaRaysville, PA (US)

( * ) Notice: Subject to any disclaimer, the term of this patent is extended or adjusted under 35 U.S.C. 154(b) by 468 days.

(21) Appl. No.: 17/693,674

(22) Filed: Mar. 14, 2022

(65) Prior Publication Data

US 2022/0290471 A1 Sep. 15, 2022

Related U.S. Application Data

(60) Provisional application No. 63/160,988, filed on Mar. 15, 2021.

(51) Int. Cl.

| | |
|---|---|
| ***E05B 83/02*** | (2014.01) |
| ***B65D 90/00*** | (2006.01) |
| ***E05C 17/00*** | (2006.01) |
| ***E05C 19/18*** | (2006.01) |

(52) U.S. Cl.
CPC .............. *E05B 83/02* (2013.01); *B65D 90/00* (2013.01); *E05C 17/025* (2013.01); *E05C 19/188* (2013.01)

(58) Field of Classification Search
CPC .......... E05B 83/02; E05B 67/36; E05B 67/38; E05B 65/0021; E05C 17/00; E05C 17/02; E05C 17/025; E05C 17/04; E05C 17/047; E05C 17/12; E05C 17/20; E05C 17/54; E05C 19/00; E05C 19/003; E05C 19/18; E05C 19/184; E05C 19/186; E05C 19/188; Y10T 292/20; Y10T 292/218; Y10T 292/221; Y10T 292/228; Y10T 292/34; Y10T 292/37; Y10T 292/376; Y10T 292/379; Y10T 292/382; Y10T 292/385; Y10T 292/388; Y10T 292/71; Y10T 292/73
See application file for complete search history.

(56) References Cited

U.S. PATENT DOCUMENTS 5,145,222 A * 9/1992 Meyer .................. E05C 19/186 70/202
5,265,922 A * 11/1993 Falcone .................. E05D 11/06 292/288
5,284,036 A * 2/1994 Rosenbaum .......... E05C 19/186 70/56

(Continued)

FOREIGN PATENT DOCUMENTS

FR 2905717 A1 * 3/2008 ............. E05B 83/12
WO WO-2010038128 A1 * 4/2010 ......... E05B 15/0046
WO WO-2011145076 A1 * 11/2011 ............. B65D 90/22

*Primary Examiner* — Kristina R Fulton
*Assistant Examiner* — Noah Horowitz
(74) *Attorney, Agent, or Firm* — Practical IP Law LLC

(57) ABSTRACT

Disclosed are various embodiments providing a device to secure a hinge of a door, such as a hinge of a door on a shipping container. The device includes a body member and a clamp member. The body member is L-shaped and is placed over a the hinge of the door and the clamp member is placed over a door panel and attached to the body member via a bolt inserted through the clamp member to attach to the body member. Access to the bolt is limited by a puck lock attached to the clamp member.

15 Claims, 7 Drawing Sheets

(56) References Cited

U.S. PATENT DOCUMENTS

| | | | | | |
|---|---|---|---|---|---|
| 5,340,172 | A * | 8/1994 | Sweet | E05C 19/003 | 292/259 R |
| 6,591,641 | B1 * | 7/2003 | Cann | E05C 19/186 | 292/259 R |
| 6,823,701 | B1 * | 11/2004 | Gogel | E05B 13/001 | 70/32 |
| 6,834,896 | B2 * | 12/2004 | Smith | E05C 19/18 | 292/259 R |
| 6,983,629 | B1 * | 1/2006 | Gogel | E05C 19/186 | 292/259 R |
| 7,047,774 | B1 * | 5/2006 | Gogel | E05B 65/0021 | 70/32 |
| 7,162,898 | B2 * | 1/2007 | Gogel | E05B 13/001 | 292/259 R |
| 7,278,663 | B2 * | 10/2007 | Witchey | E05C 19/186 | 292/259 R |
| 7,380,846 | B1 * | 6/2008 | Moreno | G09F 3/0317 | 292/259 R |
| 8,011,213 | B1 * | 9/2011 | Gogel | E05B 83/10 | 292/259 R |
| 10,107,008 | B2 * | 10/2018 | Waugh | E05C 19/18 | |
| 10,415,281 | B2 * | 9/2019 | Enos | E05C 19/184 | |
| 11,629,537 | B2 * | 4/2023 | Daniels | E05C 19/188 | 16/297 |

* cited by examiner

FIG. 7B
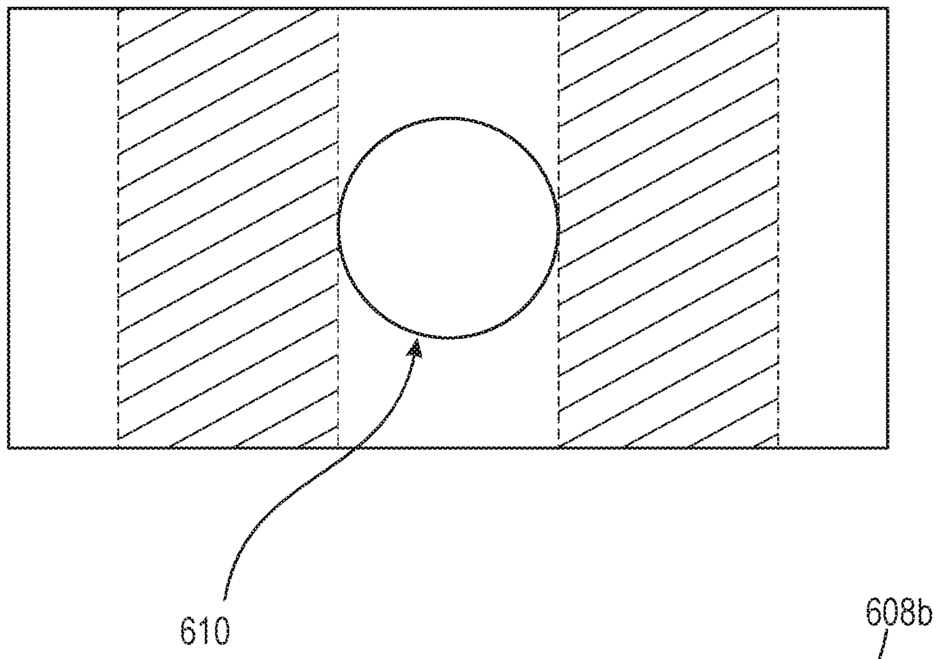
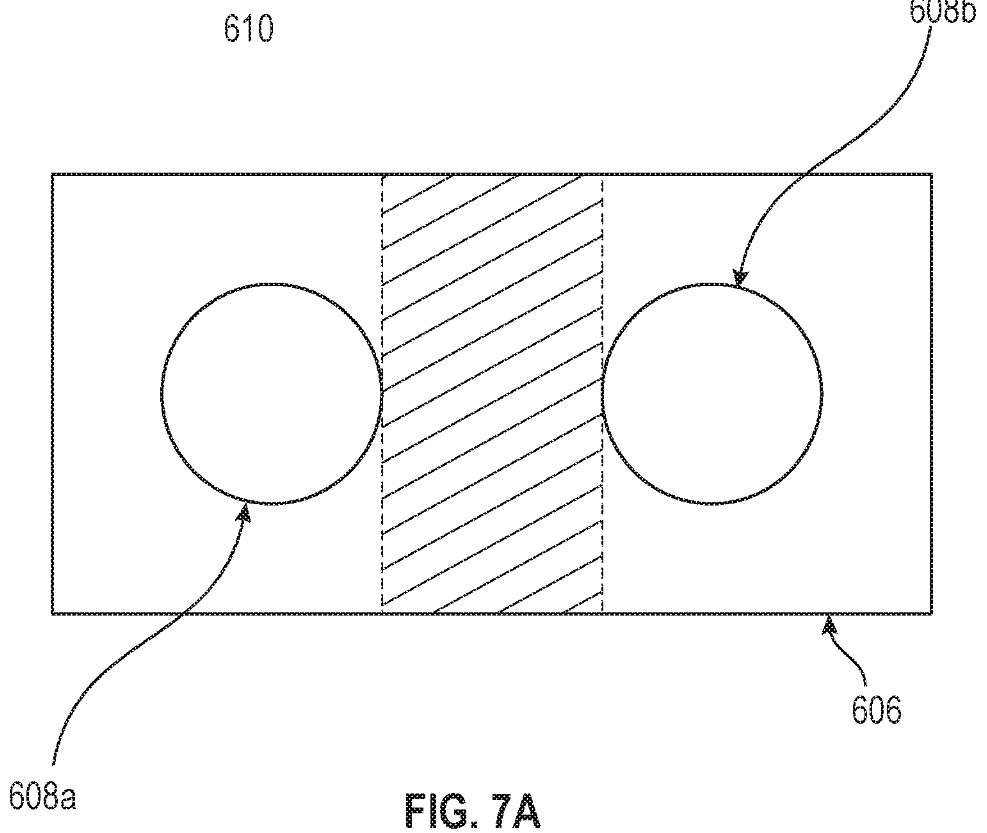
FIG. 7A

DEVICE AND METHOD FOR SECURING A DOOR

PRIORITY CLAIM

This application claims priority to U.S. Provisional Application titled "Device and Method for Securing a Door," Ser. No. 63/160,988, having a filing date of Mar. 15, 2021, the entire contents of which are incorporated herein by reference.

BACKGROUND

A shipping container has two door panels that are attached to the container's body by multiple hinges. The door panels are secured by locking bars that slide into locking keepers that are located at the top or bottom of the container body. The locking bars are connected to a locking handle that is locked using a lock. In situations where the container is transported using surface transport, such as a truck or train, it is left outside where it is accessible to those trying to gain unauthorized access to the container's contents, In those situations, it is easy to cut the lock and open the door panel in a short amount of time.

SUMMARY

Various embodiments of the present disclosure include a device and method for securing a door.

Various embodiments of the present disclosure include a device including a clamp comprising a side portion, a front portion, and a receiving member; and a body, wherein the receiving member is configured to be removably attached to a cylindrical member inserted into the receiving member through an opening in the body thereby causing the clamp to be engaged with the body.

Various embodiments of the present disclosure include a method of securing a door panel of a container, the method including placing a clamp of a securing device on a hinge of the container, the hinge attached to the door panel; placing a body of the securing device on the door panel and sliding the body such that a front portion of the body slides under a front portion of the damp; inserting a bolt into an opening in the body, such that the bolt engages a nut attached to the damp; and placing a lock to prevent access to the bolt.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows:

FIGS. 7A and 7B shows two views of a tension block in accordance with various embodiments of the present disclosure.

Figure 1:
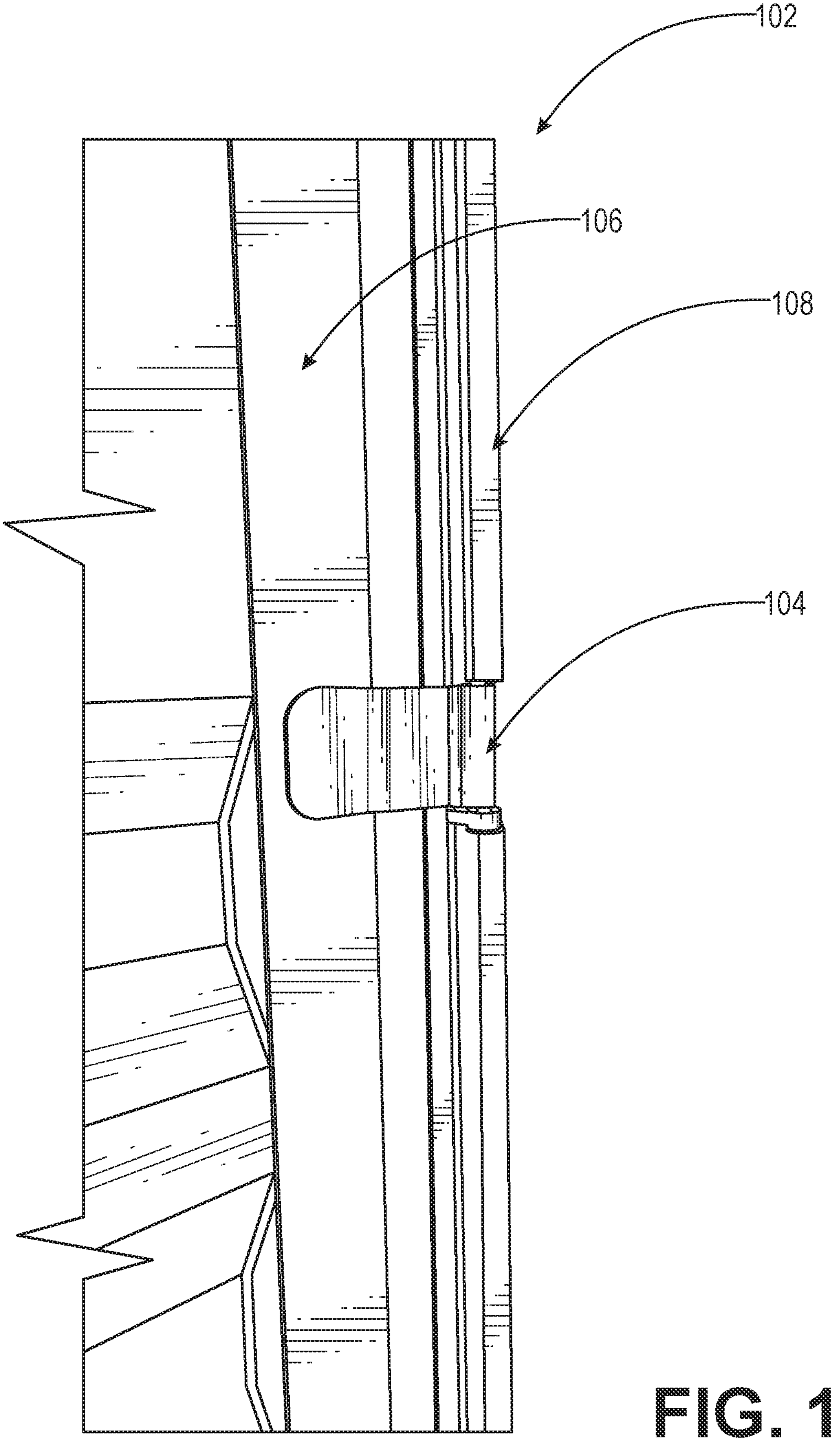
FIG. 1 shows a three-dimensional view of a hinge assembly attached to a door panel of a shipping container.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

The present disclosure describes a device to secure a hinge located on a door panel. The device clamps on to the hinge and when secured, prevents the hinge from turning due to a counter force that is applied against the hinge. This secures the door panel attached to the hinge and prevents the door panel from being opened when the device is engaged over the clamp. The lock that is used to secure the device is hidden from view, and generally more difficult to access, thereby making it difficult and time consuming for someone to try and cut the lock and disengage the device from the hinge.

In various embodiments, the present disclosure describes a hinge grip assembly to secure the hinge located on a door panel of a shipping container. Each device, as described by various embodiments of the present disclosure, may be attached to a single hinge of a door of a container. Since a container usually has two doors along the width of the container, two such devices may be used to secure both the doors. When used to secure the door panels of a shipping container, it prevents the doors from being opened when the device is engaged over at least one hinge of each door panel. Therefore, when the container is in transit, those that may try to break-in to the container may not be successful, as they will have to break the normal locks on the container, and additionally they will have to disengage the hinge grip assembly over each hinge. Disengaging the hinge grip assembly over each hinge posses an additional obstacle that may delay those trying to gain access and risk being caught in the process. Further, it may be impossible to disengage the hinge grip assembly due to its construction. For example, the hinge grip assembly may be engaged by a member and access to the member may be prevented by physically limiting access through a lock or another mechanism. The lock itself may be difficult to break due to its construction. Therefore, the hinge grip assembly provides an improvement in the field of container transportation and security by securing the hinge attached to the door and thereby preventing the door to be opened by unauthorized people.

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings.

Turning now to the drawings, exemplary embodiments are described in detail. FIG. 1 shows a three-dimensional view of a hinge attached to a door panel of a shipping container. As seen in FIG. 1, container 102 includes hinge 104 that is attached to door panel 106. Also shown in FIG. 1, is frame 108 to which hinge 104 is attached. Frame 108 has a hollow area and a lip that forms a U or J profile. Hidden from view in FIG. 1 is a gap between hinge 104 and frame 108 when viewed from a side angle.

Figure 2:
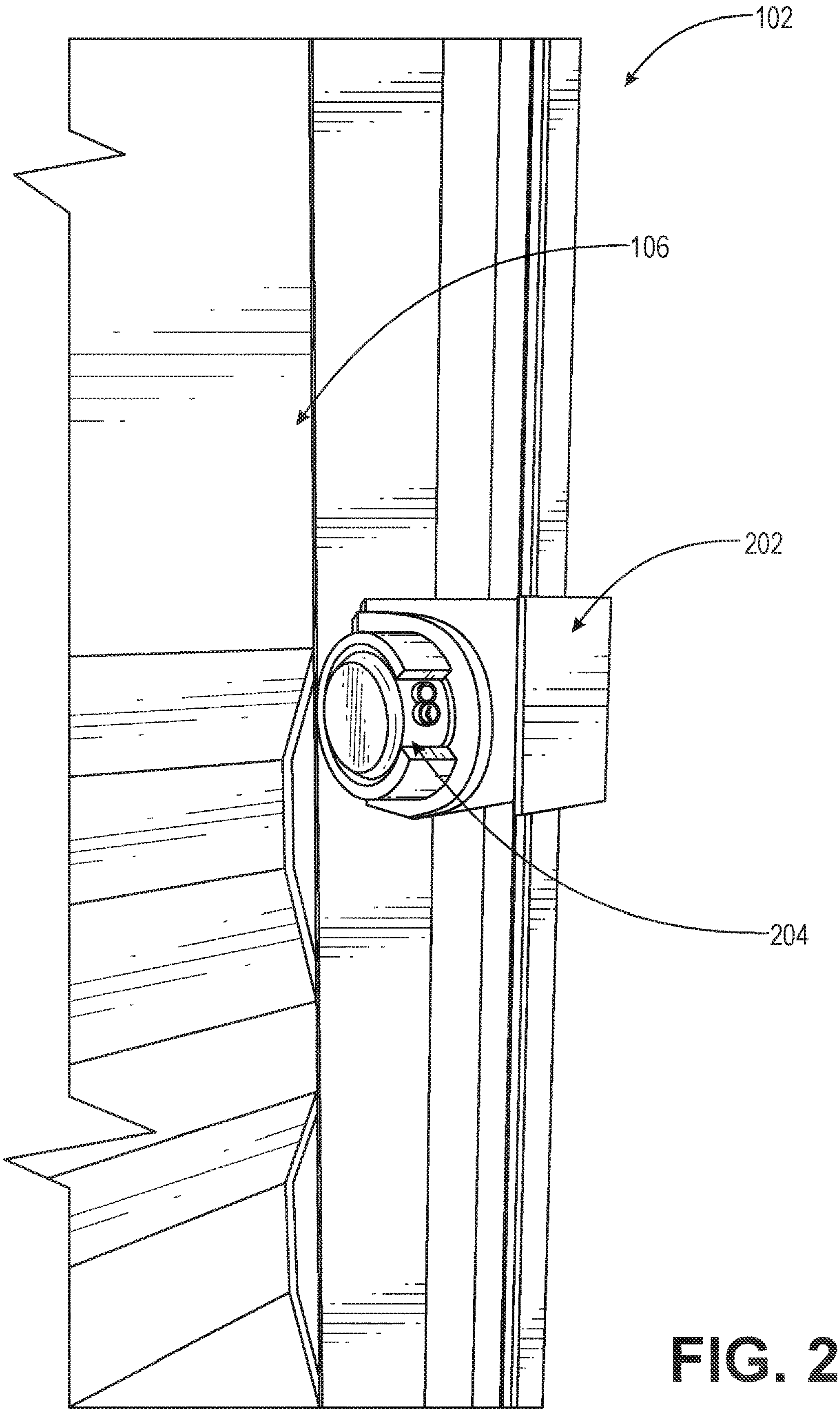
FIG. 2 shows a three-dimensional view of a hinge grip assembly attached to the hinge of a shipping container.

FIG. 2 shows a three-dimensional view of a hinge grip assembly attached to the hinge of a shipping container, in accordance with various embodiments of the present disclosure. As seen in FIG. 2, container 102 is shown with hinge grip assembly 202 attached to hinge 104 (not shown), Hinge grip assembly 202 may be secured to hinge 104 using lock 204. Lock 204 may prevent hinge grip assembly 202 to be disengaged. For hinge grip assembly 202 to be disengaged, or taken apart, lock 204 may need to be unlocked and removed from hinge grip assembly 202. Since lock 204 sits flush within hinge grip assembly 202 and does not expose any shackle or shank that would have been exposed, it is much difficult to quickly tamper with lock 204 and disengage hinge grip assembly 202. This is not the case where padlocks may be used to secure the traditional locking mechanism in the container door.

Figures 3A, 3B:
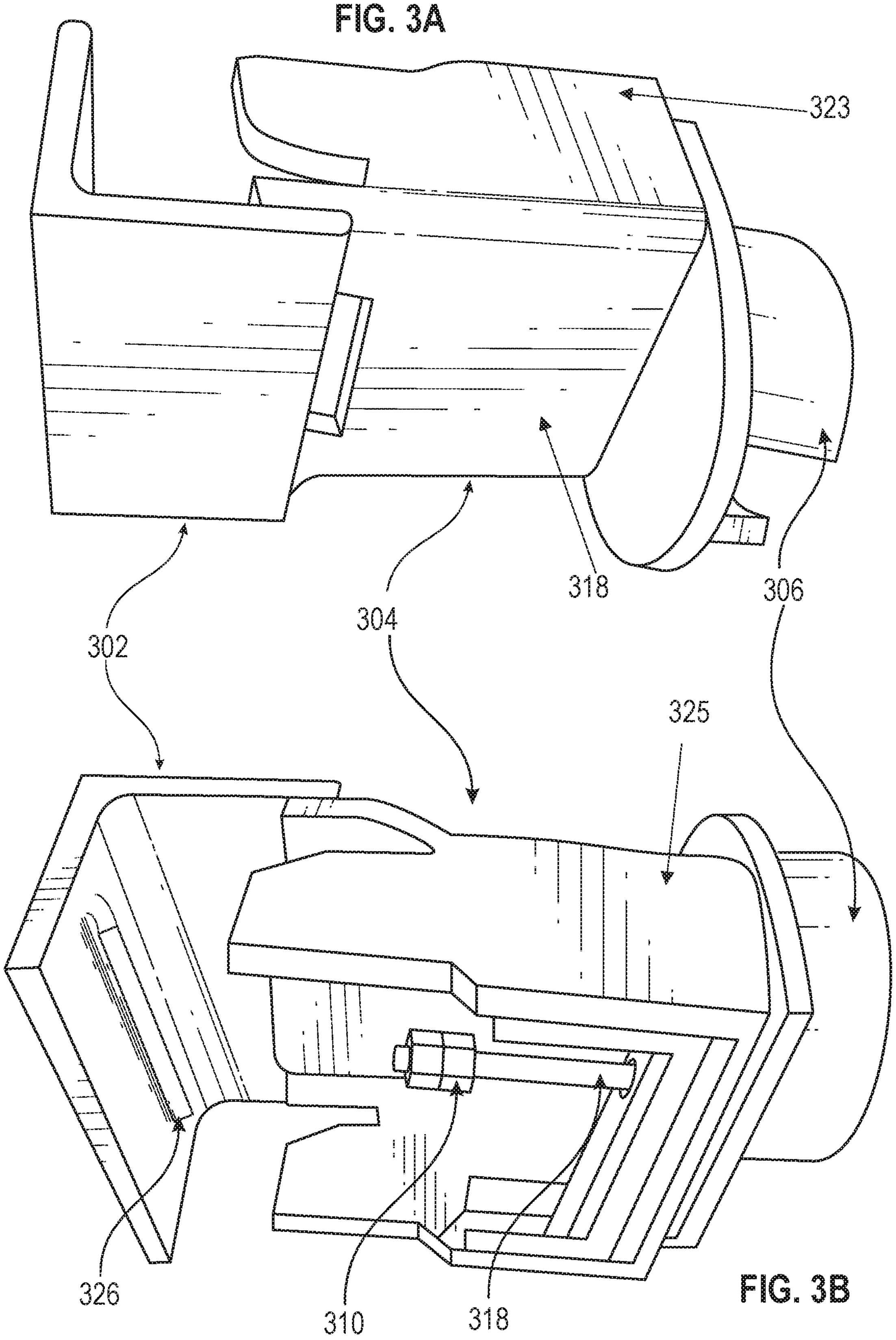
FIGS. 3A and 3B show three-dimensional views of a hinge grip assembly, in accordance with various embodiments of the present disclosure.

FIGS. 3A and 3B show three-dimensional views of a hinge grip assembly, in accordance with various embodiments of the present disclosure, As seen in FIGS. 3, hinge grip assembly 202 may include clamp 302 and body 304. Clamp 302 may be an L shaped piece or assembly. In various embodiments, clamp 302 may be a single part that may be die cast or may be pressed into shape. It may be right angular with a side portion and a top portion. In various embodiments, claim 302 may be welded or joined together using methods that will be apparent to those skilled in the art.

Body 304 may include lock ring 306. Clamp 302 may include nut 310 that may be attached to clamp 302. Nut 310 may engage with bolt 308 that may be inserted via an opening in body 304 at an end where lock ring 306 is located, or a front end. Clamp 302 may also include lip 326. Lip 326 may be a protrusion or extension that is angled and extends out of a surface, such as a side portion of clamp 302.

Body 304 may include top portion 318 and two side panels 323 and 325, with an opening at a bottom part. In various embodiments, the front end of body 304 may be attached to lock ring 306. In various embodiments, the front end of body 304 and lock ring 306 may be die cast as a single piece. A back end opposite to the front end may be open. Top portion 318, side panels 323 and 325, and the front end may form an open rectangular shape.

Figure 4:
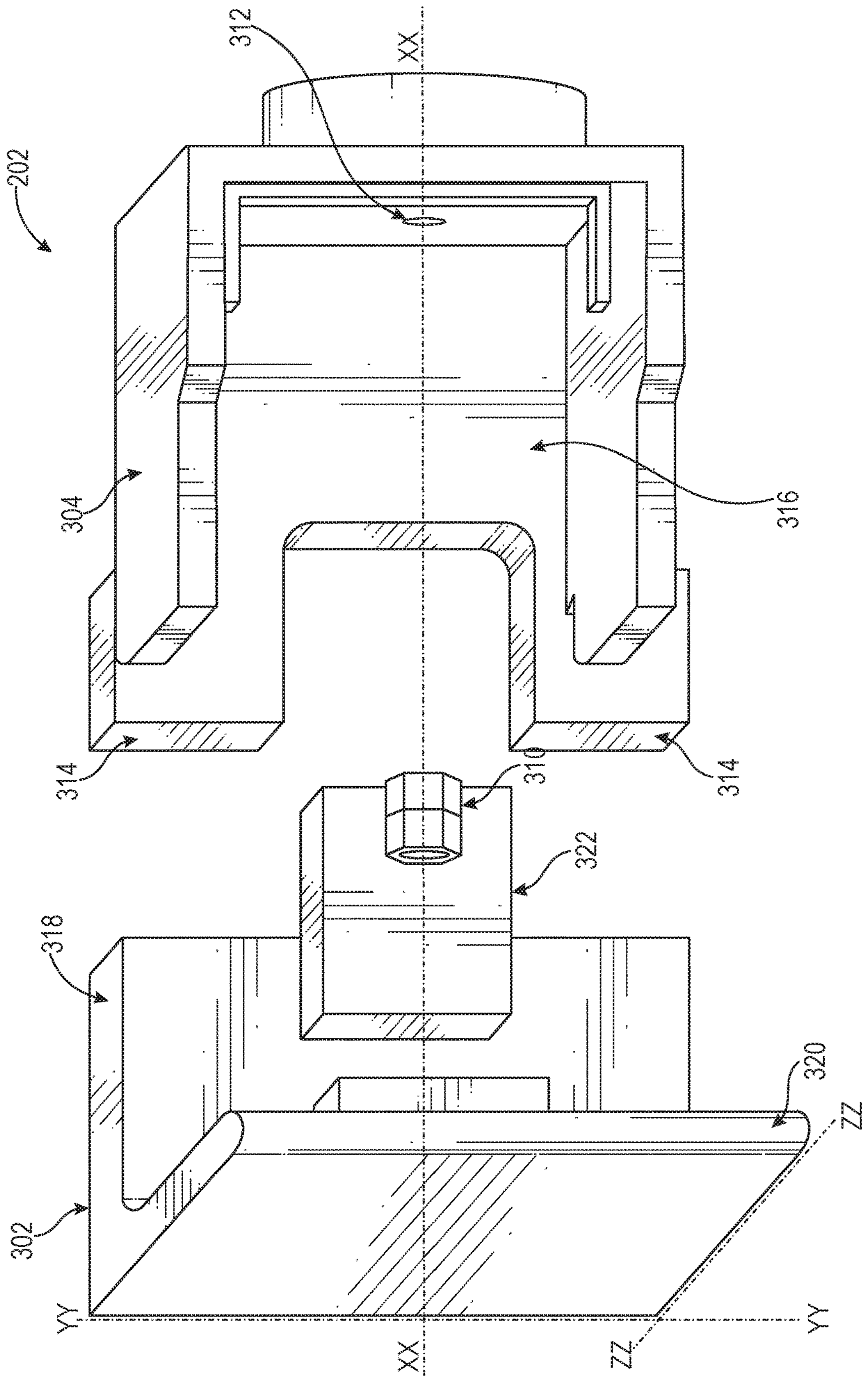
FIG. 4 shows a three-dimensional view of a hinge grip assembly, in accordance with various embodiments of the present disclosure.

FIG. 4 shows a three-dimensional view of a hinge grip assembly, in accordance with various embodiments of the present disclosure. As seen in FIG. 4, hinge grip assembly 202 is disengaged. Also shown in FIG. 4 is opening 312 in body 304. Body 304 may also include wings 314. Wings 314 may be located on the top portion of body 304 with a recess or opening in between the two wings. The top portion of body 304 and the two side panels may form an opening 316.

When body 304 is engaged with clamp 302, a portion of the top portion of body 304, such as wings 314, may slide under a top portion 318 of clamp 302. Side portion 320 of clamp 302 is perpendicular to top portion 318. Opening 316 may engage with a lip that may exist in frame 108 of container 102, around hinge 104 (as seen in FIG. 1). Nut 310 may be attached to plate 322 which may be attached to damp 302. Plate 322 may slide under the top portion of body 304 when hinge grip assembly 202 is engaged by fully tightening bolt 308 with nut 310. Hinge grip assembly 202 may be engaged by inserting bolt 308 into opening 312 from the front end. Bolt 308 may engage with nut 310 to tighten damp 302 with body 304 over hinge 104. When hinge grip assembly 202 is engaged, a portion of body 304, such as the bottom portion (or more specifically, the bottom exposed surface of the two side panels and the front end) may be contact with door panel 106. Further, side portion 320 of damp 302 may be in contact with a side portion of frame 108. Additionally, lip 326 may be designed with dimensions such that it can be partially or fully inserted into gap 110.

If door panel 106 is being opened when hinge grip assembly 202 is engaged, an outward radial force may be applied in a direction of the ZZ axes (as shown in FIG. 4) perpendicular to plane formed by the XX and YY axes (as shown in FIGS. 3 and 4), due to door panel 106 being in contact with body 304. Wings 314, which are in contact with top portion 318 of damp 302 prevent movement of body 304, which in turn prevents movement of door panel 106. Further, wings 314 dose any gap between clamp 302 and body 304. This prevents anyone trying to use a prybar or similar device to pry a gap between damp 302 and body 304. Since side portion 320 is pressed against outer portion of frame 108, it prevents damp 302 from moving in the direction of the force (as is caused side portion 320 to further press into the outer portion of frame 108). Therefore, hinge grip assembly 202 functions to keep door frame from moving outward when engaged. Since hinge grip assembly 202 is engaged by bolt 308, access to bolt 308 may be prevented by placing lock 204 into lock ring 306.

Figure 5:
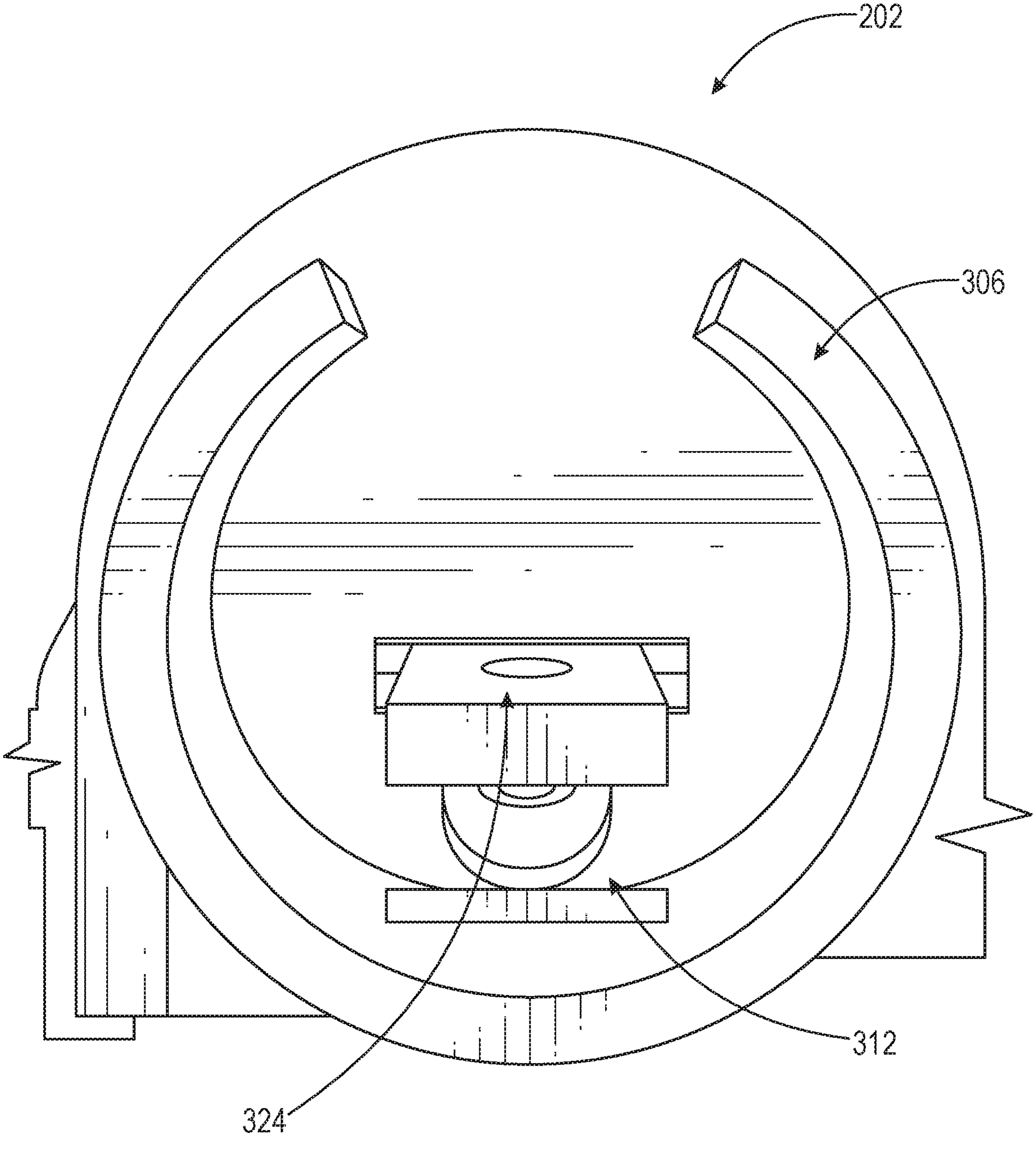
FIG. 5 shows a view of body viewed from the lock ring end of a hinge grip assembly, in accordance with various embodiments.

FIG. 5 shows a view of body viewed from the lock ring end of a hinge grip assembly, in accordance with various embodiments. Also seen in FIG. 5 is opening 312 in body 304 into which bolt 308 may be inserted, Access to bolt 308 may be prevented by attaching a lock, such as lock 204 (seen in FIG. 2). In various embodiments, lock 204 may be a puck lock. The puck lock may have an engaging cylinder that may clamp over hole 324 to ensure that puck lock is locked and engaged.

In various embodiments, nut 310 may be welded to plate 322 which may be welded to clamp 302, In various embodiments, nut 310 may be integrated with plate 322 during the manufacturing process, such as being cast as a single component, etc. In various embodiments, plate 322 may be integrated with clamp 302 during the manufacturing process.

Figure 6B:
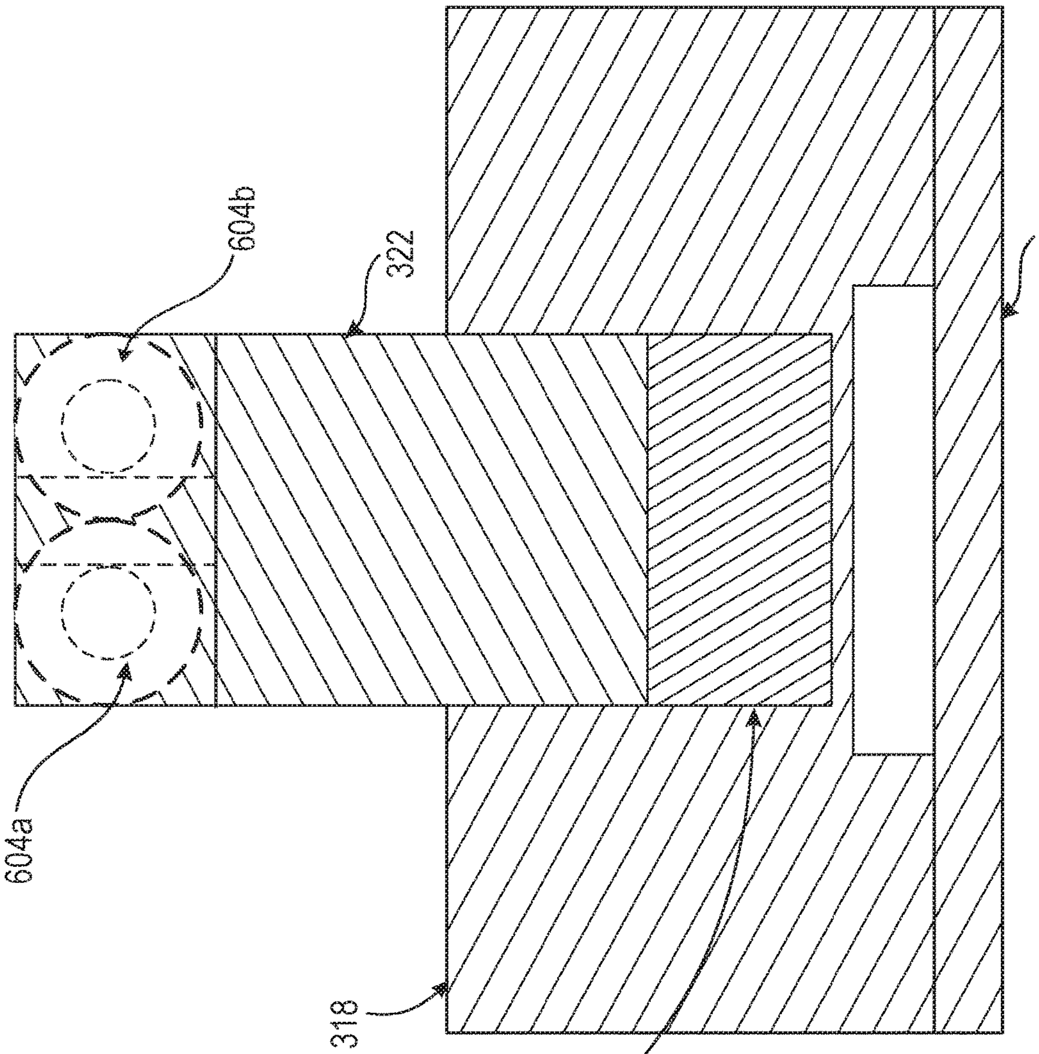
FIGS. 6A and 6B show two views of clamp in accordance with various embodiments of the present disclosure.
Figure 6A:
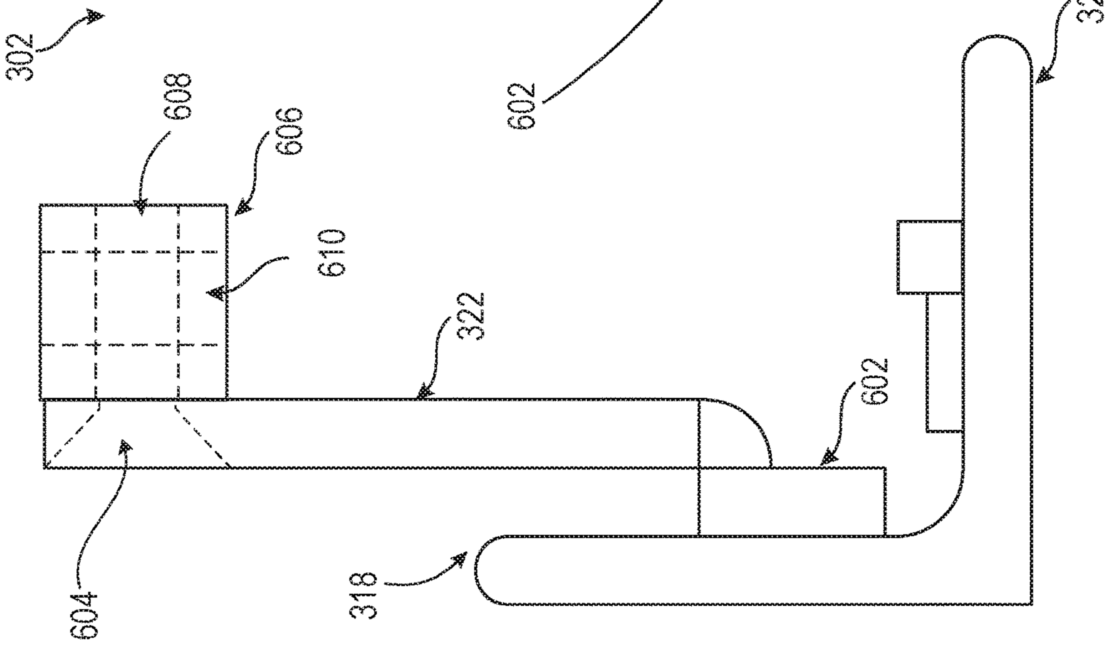

FIGS. 6A and 6B show two views of clamp in accordance with various embodiments of the present disclosure. Clamp 302 is shown with top portion 318 and side portion 320. Plate 322 is attached to top portion 318 by connector 602.

Connector 602 may be attached to top portion 318 by a weld or may be integral to top portion 318 (single cast piece), Plate 322 may be attached to connector 602 by a weld or may be integral to top portion 318 (single cast piece). Plate 322 may contain two counter-sunk holes 604, Tension block 606 is also shown in FIGS. 6A and 6B, adjacent to plate 322. Tension block 606 may be attached to plate 322 by two fasteners that are inserted through two openings 608*a* and 608*b* in tension block 606 that align with holes 604. A third opening 610 in tension block 606 (perpendicular for the two openings that align with holes 604) may receive bolt 308. This opening 610 may be threaded such that bolt 308 may directly engage with it, FIGS. 7A and 7B shows two views of a tension block in accordance with various embodiments of the present disclosure. Tension block 606 includes two openings 608*a* and 608*b* that align with the two counter-sunk holes 604 of plate 322 (as shown in FIGS. 6A and 6B). The diameter of holes 608 may match the smaller diameter of the counter-sunk holes 604. A fastener may be inserted through opening 610 to secure tension block 606 (and thus clamp 302) to body 304. Opening 610 may be threaded, allowing bolt 308 to be attached to tension block 606. Using a removably attached tension block 606, allows it to be replaceable in case of wear and tear of threads in opening 610. Alternatively, opening 610 may not be threaded and a nut may be attached to bolt 308 that extends beyond tension block 606.

In various embodiments, hinge grip assembly 202 is made from a stainless-steel plate, In various embodiments, the thickness of the stainless-steel plate is selected to withstand heat and/or physical force. In various embodiments, hinge grip assembly 202 is made from composite material, a metal, a metal alloy, or a combination of one or more of the above.

In various embodiments, a different locking mechanism may be used to secure access to bolt 308 at the front end. For example, bolt 308 may have a hole at its head that may align with hole 324 and a lock may be used to secure bolt 308 to hole 324.

In various embodiments, bolt 308 may be welded to opening 312. To disengage hinge grip assembly 202, special apparatus may be needed to remove the weld.

In various embodiments, a hinge grip assembly, in accordance with various embodiments described herein, may be attached to one hinge of each of the two door panels on a shipping container. To attach a hinge grip assembly to a hinge, such as hinge 104, clamp 302 may be placed on the outside of container 102, such that side portion 320 covers the side of the hinge and top portion 318 covers the front of the hinge. Next, body 304 is slid into place such that opening in the body, such as opening 316, mates with the frame of the container and the wings slide under the top portion A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z), Similarly, "at least one of X, Y, and Z," unless specifically stated otherwise, is to be understood to present that an item, term, etc., can be either X, Y, and Z, or any combination thereof (e.g., X, Y, and/or Z), Thus, as used herein, such phases are not generally intended to, and should not, imply that certain embodiments require at least one of either X, Y, or Z to be present, but not, for example, one X and one Y. Further, such phases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A device comprising:

a body member having a top member, two side members parallel to each other and perpendicular to the top member, back member perpendicular to the two side members and the top member, and a security portion on a second side of the back member, wherein the security portion includes a body member opening to insert a cylindrical member through the back member; and a clamp member comprising a side portion, a top portion perpendicular to the side portion, and a receiving member having a receiving member opening, wherein when the cylindrical member is inserted through the security portion and attached to the receiving member opening in a direction parallel to the two side members, the top member, and the top portion and perpendicular to the back member and the side portion, the cylindrical member causes the clamp member to be engaged with the body member.

2. The device of claim 1, where the cylindrical member includes threads on its surface that engage with threads located in the receiving member opening.

3. The device of claim 1, wherein a puck lock is attached to an extension in the security portion to limit access to the cylindrical member.

4. The device of claim 1, wherein the receiving member is attached to a surface of the top portion.

5. The device of claim 4, wherein the receiving member is attached to the surface of the top portion by an intermediate plate.

6. The device of claim 4, wherein when the clamp member is engaged with the body member, the side portion rests on a surface of a container that is perpendicular to a door of the container in a closed position.

7. The device of claim 4, wherein when the clamp member is engaged with the body member, the side portion rests on a surface of a container that is parallel to a door of the container in a closed position.

8. The device of claim 1, wherein there is a side opening on each of the two side members proximate to the top member of the body member.

9. The device of claim 8, wherein the side opening on each of the two side members mates with a frame of a container.

10. The device of claim 1, where the cylindrical member is a bolt.

11. The device of claim 1, wherein the two side members are attached to a first side of the back member and wherein the second side of the back member is opposite the first side.

12. A method of securing a door panel of a container, the method comprising:

placing a clamp member of a securing device on a hinge of the container, the hinge attached to the door panel;

placing a body member of the securing device on the door panel and sliding the body member such that a front portion of the body member slides under a front portion of the clamp member;

inserting a bolt into a body member opening, such that the bolt engages a clamp member opening; and placing a lock to prevent access to the bolt, wherein the body member includes a top member, two side members perpendicular to the top member, and a back member perpendicular to the top member and the two side members, and a security portion on a second side of the back member, wherein the security portion includes the body member opening to insert the bolt through the back member and attach to the clamp member opening.

13. The method of claim 12, wherein the lock is a puck lock, and wherein the puck lock is attached to an extension in the security portion.

14. The method of claim 12, wherein when the clamp member is engaged with the body member, the two side members rest on a surface of the container that is parallel to the door panel of the container in a closed position.

15. A method of manufacturing a securing device, the method comprising:

manufacturing a body member having a top member, two side members parallel to each other and perpendicular to the top member, and a back member perpendicular to the two side members and the top member, and a security portion on a second side of the back member, wherein the security portion includes has a body member opening to insert a bolt through the back member; and manufacturing a clamp member, the clamp member comprising a side portion, a top portion perpendicular to the side portion, and a receiving member, having a receiving member opening, wherein when the bolt is inserted through the security portion in a direction parallel to the two side members, the top member, and the top portion and in a direction perpendicular to the back member and the side portion and attached to the receiving member opening, the bolt causes the clamp member to be engaged with the body member.

* * * * *